(12) United States Patent
Pu et al.

(10) Patent No.: US 10,447,989 B2
(45) Date of Patent: Oct. 15, 2019

(54) METHOD AND DEVICE FOR SYNTHESIZING DEPTH IMAGES

(71) Applicant: Hangzhou Hikvision Digital Technology Co., Ltd., Hangzhou, Zhejiang (CN)

(72) Inventors: Shiliang Pu, Zhejiang (CN); Jingxiong Wang, Zhejiang (CN); Hui Mao, Zhejiang (CN); Linjie Shen, Zhejiang (CN); Hai Yu, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 15/775,593

(22) PCT Filed: Aug. 23, 2016

(86) PCT No.: PCT/CN2016/096353
§ 371 (c)(1),
(2) Date: May 11, 2018

(87) PCT Pub. No.: WO2017/080280
PCT Pub. Date: May 18, 2017

(65) Prior Publication Data
US 2018/0338134 A1   Nov. 22, 2018

(30) Foreign Application Priority Data
Nov. 13, 2015   (CN) .......................... 2015 1 0778905

(51) Int. Cl.
*H04N 13/00*   (2018.01)
*H04N 13/156*   (2018.01)
(Continued)

(52) U.S. Cl.
CPC .............. *H04N 13/156* (2018.05); *G06T 7/30* (2017.01); *G06T 7/593* (2017.01); *H04N 5/262* (2013.01);
(Continued)

(58) Field of Classification Search
USPC ....................................... 348/42, 43
See application file for complete search history.

(56) References Cited

U.S. PATENT DOCUMENTS

| | | | | |
|---|---|---|---|---|
| 6,903,735 B2 * | 6/2005 | Jeong | .................. | H04N 13/117 345/418 |
| 7,006,709 B2 * | 2/2006 | Kang | ...................... | G06K 9/32 345/422 |

(Continued)

FOREIGN PATENT DOCUMENTS

| | | |
|---|---|---|
| CN | 102763420 A | 10/2012 |
| CN | 104429079 A | 3/2015 |
| CN | 104641633 A | 5/2015 |

OTHER PUBLICATIONS

International Search Report and Written Opinion dated Nov. 18, 2016, from International Application No. PCT/CN2016/096353, 8 pages.

(Continued)

*Primary Examiner* — Nigar Chowdhury
(74) *Attorney, Agent, or Firm* — Meunier Carlin & Curfman LLC

(57) ABSTRACT

Embodiments of the present application disclose a method and a device for synthesizing depth images, which relate to the technical field of image processing. The method includes: obtaining depth images to be synthesized, which are shot by real depth cameras respectively, wherein y-axes of respective camera coordinate systems of the real depth cameras are parallel to each other; calculating a mapping pixel point in a camera coordinate system corresponding to (Continued)

a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras; and generating a target synthesized depth image corresponding to the depth images to be synthesized, according to calculated mapping pixel points. By applying the solutions provided by the embodiments of the present application, a depth image with a large field of view can be obtained by image synthesis.

15 Claims, 5 Drawing Sheets

(51) Int. Cl.
| | | |
|---|---|---|
| *H04N 5/77* | (2006.01) | |
| *H04N 5/262* | (2006.01) | |
| *H04N 13/20* | (2018.01) | |
| *G06T 7/30* | (2017.01) | |
| *G06T 7/593* | (2017.01) | |
| *H04N 13/111* | (2018.01) | |

(52) U.S. Cl.
CPC ............ *H04N 5/77* (2013.01); *H04N 13/111* (2018.05); *H04N 13/20* (2018.05); *G06T 2207/10028* (2013.01)

(56) References Cited

U.S. PATENT DOCUMENTS

| | | | |
|---|---|---|---|
| 7,298,329 B2 * | 11/2007 | Diament | H01Q 1/523 343/700 MS |
| 2012/0176481 A1 | 7/2012 | Lukk et al. | |
| 2014/0104394 A1 | 4/2014 | Yanai et al. | |
| 2014/0293010 A1 | 10/2014 | Nguyen et al. | |

OTHER PUBLICATIONS

First Office Action; Chinese Application No. 201510778905.6; dated Mar. 18, 2019.

Extended European Search Report dated Jun. 28, 2019, from International Application No. PCT/CN2016/096353, 13 pages.

Hiruma, K., et aL, "View Generation for a Virtual Camera Using Multiple Depth Maps", Electronics and Communications in Japan, Part 3, vol. 87, No. 10, Part 03, Oct. 2004, pp. 81-88.

Castaneda, Victor, et al., "Stereo Time-of-Flight", International Conference on Computer Vision, Nov. 2011, pp. 1684-1691.

Nair Rahul et al., "A Survey on Time-of-Flight Stereo Fusion", International Conference on Computer Analysis of Images and Patterns, pp. 105-127.

* cited by examiner

METHOD AND DEVICE FOR SYNTHESIZING DEPTH IMAGES

The present application claims the priority to a Chinese Patent Application No. 201510778905.6, filed with State Intellectual Property Office of People's Republic of China on Nov. 13, 2015, and entitled "Method and Device for Synthesizing Depth Images", which is hereby incorporated into the present application by reference in its entirety.

TECHNICAL FIELD

The present application relates to the technical field of image processing, and in particular to a method and device for synthesizing depth images.

BACKGROUND

Depth cameras have attracted more and more attention in the field of machine vision, since they possess characteristics that the images shot by a depth camera can provide users with abundant information regarding the position between shot objects. For example, depth cameras are applied in the field of video monitoring, motion sensing game and the like.

The practical application of depth cameras involves aspects such as positioning, identifying, and tracking of a target person, which can usually render better effects within a large field of view, regardless of in the field of video monitoring or motion sensing game. However, for the existing depth images taken by a single depth camera, the field of view thereof is generally small, which can hardly meet the requirements of practical applications. Therefore, it is necessary to provide a method for synthesizing depth images shot by a plurality of depth cameras into a depth image with a large field of view.

SUMMARY OF THE INVENTION

Embodiments of the present application disclose a method for synthesizing depth images so as to synthesize the depth images shot by a plurality of depth cameras into a depth image with a large field of view.

In order to achieve the above objectives, embodiments of the present application disclose a method for synthesizing depth images, wherein the method includes:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

In a specific implementation of the present application, the pixel point mapping relationship is pre-obtained by:

obtaining a lens optical center position of the virtual depth camera and a focal distance of the virtual depth camera;

calculating distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles In a specific implementation of the present application, information of each pixel point in each of the depth images to be synthesized at least includes an absolute distance depth component;

the obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles, comprises: in case that a lens optical center of a real depth camera is located at left side of the lens optical center of the virtual depth camera, an obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1 * B * d1} \\ x2 = k2 - \dfrac{k3}{d1} \\ y2 = k4 \end{cases},$$

-continued wherein, $$\begin{cases} k1 = 2*\dfrac{\sqrt{x1^2+f1^2}}{\sqrt{x1^2+y1^2+f1^2}}*\cos\alpha \\ k2 = f2*\cot\alpha \\ k3 = f2*\dfrac{B}{\sin\alpha}*\dfrac{\sqrt{s1^2+y1^2+f1^2}}{\sqrt{x1^{21}+f1^2}} \\ k4 = \dfrac{y1}{\sin\alpha*\sqrt{x1^2+f1^2}}*f2 \end{cases},$$

$$\alpha = \begin{cases} \theta + \arctan\left(\dfrac{f1}{x1}\right) & x1 > 0 \\ \theta + 90° & x1 = 0 \\ \theta + \arctan\left(\dfrac{f1}{x1}\right) + 180° & x1 < 0 \end{cases}$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; d2 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera;

in case that a lens optical center of a real depth camera is located at right side of the lens optical center of the virtual depth camera, the obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2+B^2-k1*B*d1} \\ x2 = -k2+\dfrac{k3}{d1} \\ y2 = k4 \end{cases},$$

wherein, $$\begin{cases} k1 = 2*\dfrac{\sqrt{x1^2+f1^2}}{\sqrt{x1^2+y1^2+f1^2}}*\cos\alpha \\ k2 = f2*\cot\alpha \\ k3 = f2*\dfrac{B}{\sin\alpha}*\dfrac{\sqrt{x1^2+y1^2+f1^2}}{\sqrt{x1^{21}+f1^2}} \\ k4 = \dfrac{y1}{\sin\alpha*\sqrt{x1^2+f1^2}}*f2 \end{cases};$$

$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

in case that a lens optical center of a real depth camera overlaps with the lens optical center of the virtual depth camera, the distance between the lens optical center of this real depth camera and the lens optical center of the virtual depth camera is 0, the obtained mapping relationship between pixel points in the camera coordinate system corresponding to this real depth camera and pixel points in the camera coordinate system corresponding to the virtual depth camera is as follow:

$$\begin{cases} d2 = d1 \\ x2 = k2 \\ y2 = k4 \end{cases},$$

wherein, $$\begin{cases} k2 = f2*\cot\alpha \\ k4 = \dfrac{y1}{\sin\alpha*\sqrt{x1^2+f1^2}}*f2 \end{cases}$$

$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

In a specific implementation of the present application, the generating a target synthesized depth image corresponding to the depth images to be synthesized, according to the calculated mapping pixel points includes:

obtaining, among the calculated mapping pixel points, pixel points that are located within a field of view of the virtual depth camera, wherein the field of view of the virtual depth camera is determined according to the lens optical center position of the virtual depth camera and fields of view of the real depth cameras; and generating the target synthesized depth image corresponding to the depth images to be synthesized according to obtained pixel points.

In a specific implementation of the present application, the information of each pixel point in each of the depth images to be synthesized further includes a confidence component;

the generating the target synthesized depth image corresponding to the depth images to be synthesized according to the obtained pixel points includes:

processing the obtained pixel points by retaining pixel points in accordance with a rule that a pixel point with the maximum confidence among pixel points that are mapped to a same point in the camera coordinate system corresponding to the virtual depth camera is retained; and generating the target synthesized depth image corresponding to the depth images to be synthesized according to retained pixel points.

In order to achieve the above objectives, embodiments of the present application disclose a device for synthesizing depth images, wherein the device includes:

a depth image obtaining module is configured to obtain depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

a mapping pixel point calculation module is configured to calculate a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and a synthesized depth image generation module is configured to generate a target synthesized depth image corresponding to the depth images to be synthesized, according to calculated mapping pixel points.

In a specific implementation of the present application, the device for synthesizing depth images further includes:

a mapping relationship obtaining module is configured to pre-obtain pixel point mapping relationship;

wherein the mapping relationship obtaining module includes:

a lens optical center and focal distance obtaining sub-module is configured to obtaining a lens optical center position of the virtual depth camera and a focal distance of the virtual depth camera;

a distance and angle calculation sub-module is configured to calculate distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and a mapping relationship obtaining sub-module is configured to obtain the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles.

In a specific implementation of the present application, information of each pixel point in each of the depth images to be synthesized at least includes an absolute distance depth component;

the mapping relationship obtaining sub-module is specifically configured to:

in case that a lens optical center of a real depth camera is located at left side of the lens optical center of the virtual depth camera, obtain the mapping relationship between pixel points in the camera coordinate system corresponding to this real depth camera and pixel points in the camera coordinate system corresponding to the virtual depth camera as follow:

$$\begin{cases} d2 = \sqrt{d1^2 + B^2 - k1*B*d1} \\ x2 = k2 - \dfrac{k3}{d1} \\ y2 = k4 \end{cases},$$

wherein, $$\begin{cases} k1 = 2*\dfrac{\sqrt{x1^2 + f1^2}}{\sqrt{x1^2 + y1^2 + f1^2}}*\cos\alpha \\ k2 = f2*\cot\alpha \\ k3 = f2*\dfrac{B}{\sin\alpha}*\dfrac{\sqrt{s1^2 + y1^2 + f1^2}}{\sqrt{x1^{21} + f1^2}} \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases},$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; d2 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera;

in case that a lens optical center of a real depth camera is located at right side of the lens optical center of the virtual depth camera, obtain the mapping relationship between pixel points in the camera coordinate system corresponding to this real depth camera and pixel points in the camera coordinate system corresponding to the virtual depth camera as follow:

$$\begin{cases} d2 = \sqrt{d1^2 + B^2 - k1*B*d1} \\ x2 = -k2 + \dfrac{k3}{d1} \\ y2 = k4 \end{cases},$$

-continued wherein, $$\begin{cases} k1 = 2 * \dfrac{\sqrt{x1^2 + f1^2}}{\sqrt{x1^2 + y1^2 + f1^2}} * \cos\alpha \\ k2 = f2 * \cot\alpha \\ k3 = f2 * \dfrac{B}{\sin\alpha} * \dfrac{\sqrt{x1^2 + y1^2 + f1^2}}{\sqrt{x1^{21} + f1^2}} \\ k4 = \dfrac{y1}{\sin\alpha * \sqrt{x1^2 + f1^2}} * f2 \end{cases},$$

$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

in case that a lens optical center of a real depth camera overlaps with the lens optical center of the virtual depth camera, the distance between the lens optical center of this real depth camera and the lens optical center of the virtual depth camera is 0, obtain the mapping relationship between pixel points in the camera coordinate system corresponding to this real depth camera and pixel points in the camera coordinate system corresponding to the virtual depth camera as follow:

$$\begin{cases} d2 = d1 \\ x2 = k2 \\ y2 = k4 \end{cases},$$

wherein, $$\begin{cases} k2 = f2 * \cot\alpha \\ k4 = \dfrac{y1}{\sin\alpha * \sqrt{x1^2 + f1^2}} * f2 \end{cases}$$

$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

In a specific implementation of the present application, the synthesized depth image generation module includes:

a pixel point obtaining sub-module is configured to obtain, among the calculated mapping pixel points, pixel points that are located within a field of view of the virtual depth camera, wherein the field of view of the virtual depth camera is determined according to the lens optical center position of the virtual depth camera and fields of view of the real depth cameras; and a synthesized depth image obtaining sub-module is configured to generate the target synthesized depth image corresponding to the depth images to be synthesized according to obtained pixel points.

In a specific implementation of the present application, the information of each pixel point in each of the depth images to be synthesized further includes a confidence component;

the synthesized depth image obtaining sub-module includes:

a pixel point retaining processing unit is configured to process the obtained pixel points by retaining pixel points in accordance with a rule that a pixel point with the maximum confidence among pixel points that are mapped to a same point in the camera coordinate system corresponding to the virtual depth camera is retained; and a synthesized depth image obtaining unit is configured to generate the target synthesized depth image corresponding to the depth images to be synthesized according to retained pixel points.

In order to achieve the above objectives, embodiments of the present application disclose a terminal, wherein the terminal includes:

a processor, a memory, communication interfaces and a bus;

wherein the processor, the memory and the communication interfaces is connected and communicated with each other via the bus;

the memory is configured to store executable program codes;

the processor is configured to execute the executable program codes stored in the memory so as to carry out the method for synthesizing depth images according to the embodiments of the present application.

Accordingly, embodiments of the application further provide an application program, wherein the application program is configured to carry out the method for synthesizing depth images according to the embodiments of the present application during operation.

Accordingly, embodiments of the application further provide a storage medium, wherein the storage medium is configured to store executable program codes which are executed so as to carry out the method for synthesizing depth images according to the embodiments of the present application during operation.

It can be seen from above that, in the solution provided by the embodiments of the present application, after the images to be synthesized, which are shot by the real depth cameras respectively, are obtained, the pixel points in the images to be synthesized are mapped into a camera coordinate system corresponding to a virtual depth camera in order to obtain the mapping pixel points in the camera coordinate system corresponding to the virtual depth camera for the pixel points in the images to be synthesized, and a target synthesized depth image corresponding to the depth images to be synthesized is generated according to the obtained mapping pixel points. A depth image synthesized in this way provides intuitive feeling that it is shot by the virtual depth camera. The field of view of the synthesized depth image is larger than that of a single depth image to be synthesized because the synthesized depth image contains the information in the respective depth images to be synthesized.

BRIEF DESCRIPTION OF DRAWINGS

In order to describe the embodiments of the present application and the technical solutions in the prior art more clearly, drawings required for the embodiments of the present application and the prior art will be described briefly below. It is obvious that the drawings below are only for some embodiments of the present application, and those skilled in the art can also obtain other drawings based on these drawings without any creative efforts.

DETAILED DESCRIPTION OF THE INVENTION

In order to make the objectives, technical solutions as well as advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without doing creative works fall into the protection scope defined by the present application.

Figure 1:
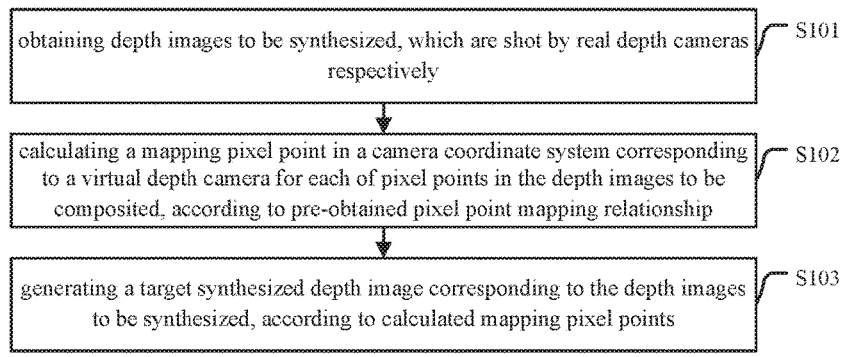
FIG. 1 is a schematic flowchart of a method for synthesizing depth images provided by an embodiment of the present application.

FIG. 1 is a schematic flowchart of a method for synthesizing depth images provided by an embodiment of the present application, wherein the method includes:

S101: obtaining depth images to be synthesized, which are shot by real depth cameras respectively.

A depth camera, like a normal camera, has a certain resolution. However, the distance between the object corresponding to this pixel point and the depth camera, instead of the grayscale and color information corresponding to this point, is stored in the respective pixel points thereof. This distance can be referred to as "depth". It can be seen from the above description that an output of the depth camera is a depth image, in which value of each pixel point represents distance from an object corresponding to this pixel point to the depth camera used to shoot the image.

It should be noted that the above real depth cameras can be respectively located in different positions when shooting the depth images to be synthesized, but y-axes of the camera coordinate systems corresponding to the real depth cameras are parallel to each other.

Specifically, in order to synthesize a depth image with a larger field of view, lens optical centers of the real depth cameras can be located at a same line and be located at different positions in the line without overlapping.

S102: calculating a mapping pixel point in a camera coordinate system corresponding to a virtual depth camera for each of pixel points in the depth images to be synthesized, according to pre-obtained pixel point mapping relationship.

In the solution provided by the present embodiment, a depth image with a large field of view is mainly obtained by synthesizing the depth images taken by a plurality of real depth cameras into one depth image. It can be understood by those skilled in the art that this depth image with a large field of view can be imagined as being taken by a real depth camera with a large field of view Therefore, during the obtaining of the above depth image with a large field of view, it is possible to establish a virtual depth camera, and the above depth image with a large field of view is interpreted as being shot by this virtual depth camera.

In view of the above description, a virtual depth camera should meet the following conditions:

camera parameters of the virtual depth camera are determined according to camera parameters of the real depth cameras, wherein the camera parameters can include information such as a field of view of the camera, a lens optical center position, a focal distance and the like, which are not limited in the present application; a lens optical center of the virtual depth camera is located in a connecting line of lens optical centers of the real depth cameras, and an x-axis of the camera coordinate system corresponding to the virtual depth camera is parallel to the connecting line of lens optical centers of the real depth cameras.

Furthermore, the above pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera.

When the real depth cameras are shooting the images to be synthesized respectively, once the relative positions of the respective real depth cameras and the camera parameters of the virtual depth camera are determined, the mapping relationship between pixel points in the camera coordinate systems corresponding to the respective real depth cameras and pixel points in the camera coordinate system corresponding to the virtual depth camera is uniquely determined. Therefore, in case that the above relative positions of the respective real depth cameras and the camera parameters of the virtual depth camera are unchanged, the pixel point mapping relationship may be obtained for once before the synthesizing of the first frame of a depth image. Specifically, for example, the above pixel point mapping relationship can be derived and obtained during an initialization phase according to the camera parameters of the respective real depth cameras and the camera parameters of the virtual depth camera, and then can be stored in a data table. This mapping relationship can be obtained by looking up the table during depth image synthesizing at a later stage, which can speed up the synthesizing of a depth image.

Specifically, the pixel point mapping relationship can be pre-obtained by:

firstly, obtaining a lens optical center position of the virtual depth camera and a focal distance of the virtual depth camera; then calculating distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and finally, obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles.

The field of view of a virtual depth camera is influenced by the field of view of the respective real depth cameras and the lens optical center position of the virtual depth camera, and the requirements for the field of view of a synthesized depth image are usually determined. Thus, in actual applications, the lens optical center position of the virtual depth camera can be determined according to the field of view of the respective real depth cameras and the requirements for the field of view of the synthesized depth image. Optionally, it is also possible to determine the lens optical center of the virtual depth camera in a manually setting manner.

No matter which manner above is employed to determine the lens optical center of the virtual depth camera, the lens optical center of the virtual depth camera is necessary to be located in connecting line of the lens optical centers of the real depth cameras.

In a specific implementation of the present application, the resolution of the virtual depth camera can be preset. After the field of view of the virtual depth camera is determined, the focal distance of the virtual depth camera can be determined according to a preset camera model, for example, a pinhole camera model, in combination with the resolution of the virtual depth camera and the field of view of the virtual depth camera.

In another specific implementation of the present application, the focal distance of a virtual depth camera, instead of the resolution of the virtual depth camera, can be preset directly. Similar to the above method, after the field of view of the virtual depth camera is determined, the resolution of the virtual depth camera can be determined according to a preset camera model in combination with the focal distance of the virtual depth camera and the field of view of the virtual depth camera, and then the virtual depth camera can be uniquely determined.

Figure 2A:
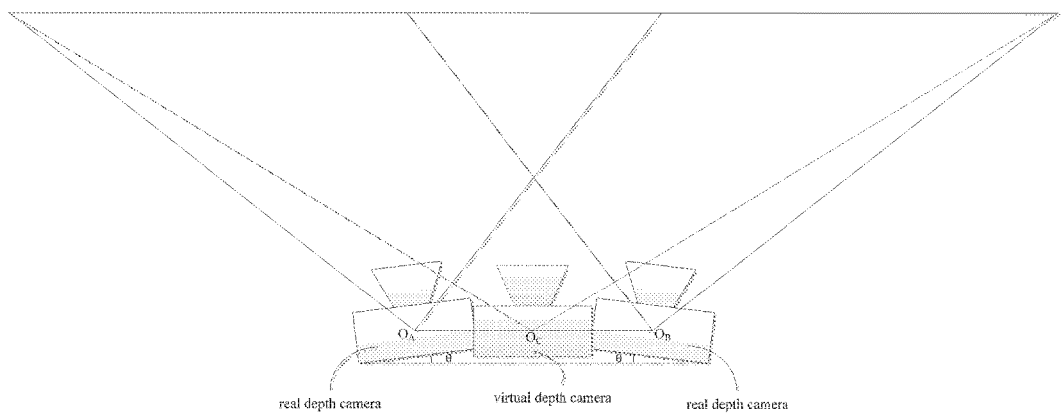
FIG. 2a is a schematic distribution diagram of real depth cameras and a virtual depth camera provided by an embodiment of the present application.

Reference to FIG. 2a, a schematic distribution diagram of real depth cameras is provided, in which two real depth cameras are included, wherein point $O_A$ and point $O_B$ are lens optical centers of the two real depth cameras; point $O_C$ is the lens optical center of the virtual depth camera; the distance between point $O_A$ and point $O_C$ and the distance between point $O_B$ and point $O_C$ are the distances between the two real depth cameras and the virtual depth camera respectively; the angle θ in the diagram represents an angle between an imaging plane of each of the two real depth cameras and an imaging plane of the virtual depth camera; the angles between the two real depth cameras and the virtual depth camera in the diagram are equal.

Figure 2B:
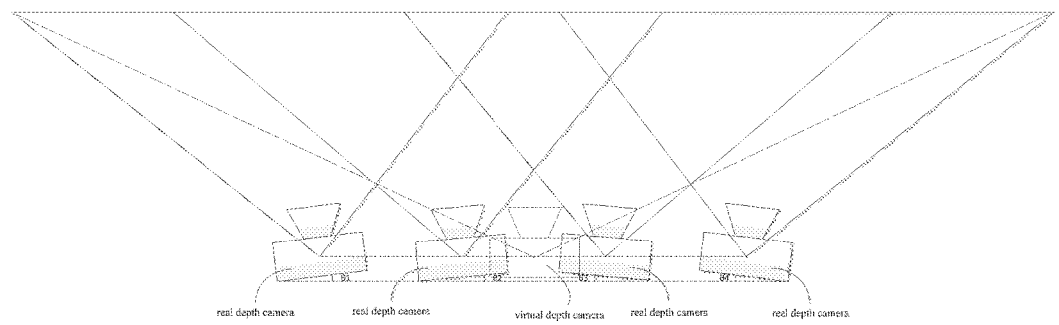
FIG. 2b is another schematic distribution diagram of real depth cameras and a virtual depth camera provided by an embodiment of the present application.

Reference to FIG. 2b, another schematic distribution diagram of real depth cameras is provided. Similar to the schematic distribution diagram shown in FIG. 2a, four real depth cameras are included in this schematic distribution diagram, wherein the depth camera shown in dotted lines is the virtual depth camera corresponding to the four real depth cameras and the region between the two dotted lines, which go through the lens optical center of the virtual depth camera and do not go through the lens optical centers of the real depth cameras, is the field of view of the virtual depth camera.

It should be noted that the angles between the imaging planes of the real depth cameras and the imaging plane of the virtual depth camera can be equal or unequal, and the values thereof can be 0, positive values or negative values, which is not limited in the present application.

S103: generating a target synthesized depth image corresponding to the depth images to be synthesized, according to calculated mapping pixel points.

Description is made below through specific examples regarding how to obtain the pixel point mapping relationship.

Figure 3A:
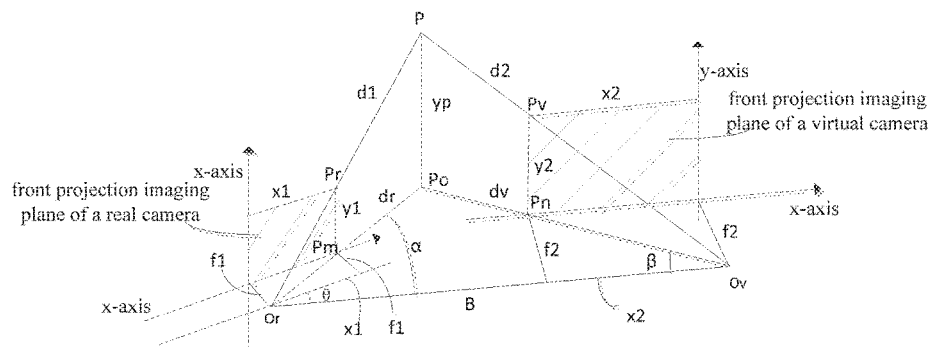
FIG. 3a is a projection relationship diagram between a real depth camera and a virtual depth camera provided by an embodiment of the present application.

Reference to FIG. 3a, a projection relationship diagram between a real depth camera and a virtual depth camera is provided. The projection relationship diagram is directed to a real depth camera and a virtual depth camera, and the lens optical center of the real depth camera is located on the left side of the lens optical center of the virtual depth camera.

Wherein Or represents a lens optical center of a real depth camera; Ov represents the lens optical center of the virtual depth camera; the connecting line of Or and Ov is parallel to the imaging plane of the virtual depth camera; this connecting line is represented as LB, and the distance between Or and Ov represented as B. Rectangular coordinate systems are established according to the front projection model of camera imaging at Or and Ov respectively; the x-axes of two coordinate systems are coplanar; the y-axes are parallel to each other; the angle between the x-axes of the two coordinate systems is represented as θ, that is, the angle between the imaging plane of the real depth camera and the imaging plane of the virtual depth camera is represented as θ. The focal distance of a real depth camera is represented as f1, and the focal distance of the virtual depth camera is represented as f2. With respect to a certain point P in space, the projection point in the camera coordinate system corresponding to the real depth camera is represented as Pr with a coordinate of (x1, y1) and the corresponding depth value of d1; the projection point in the camera coordinate system corresponding to the virtual depth camera is represented as Pv with a coordinate of (x2, y2) and the corresponding depth value of d2, and the y-axis coordinates of the point P relative to the two coordinate systems are equal, which is represented as yp. The projection point of the spatial point P in the plane in which the x-axes of the two coordinate systems are located is Po; the distance of the connecting line of Po and Or is represented as dr; the distance of the connecting line of Po and Ov is represented as dv; the angle between the line connecting Po and Or and LB is represented as α; the angle between the connecting line of Po and Ov and LB is represented as β. Among the above parameters, B, θ, f1, f2 are known quantities during the calculation process.

The projection point of a point Pr in the line segment OrPo is Pm, and the projection point of a point Pv in the line segment OvPo is Pn.

As the right triangle OrPoP is similar to the right triangle OrPmPr in FIG. 3a, the following relational expression can be obtained:

$$\frac{\sqrt{x1^2 + y1^2 + f1^2}}{d1} = \frac{y1}{yp} = \frac{\sqrt{x1^2 + f1^2}}{dr}.$$

According to the above relational expression, it can be derived that:

$$yp = d1 * \frac{y1}{\sqrt{x1^2 + y1^2 + f1^2}},$$

-continued $$dr = d1 * \frac{\sqrt{x1^2 + f1^2}}{\sqrt{x1^2 + y1^2 + f1^2}},$$

$$\alpha = \alpha = \begin{cases} \theta - \arctan\left(\frac{f1}{x1}\right) + 180° & x1 > 0 \\ \theta + 90° & x1 = 0 \\ \theta - \arctan\left(\frac{f1}{x1}\right) & x1 < 0 \end{cases}.$$

According to the Cosine Law, there is:

$$dv^2 = dr^2 + B^2 - 2*B*dr*\cos\alpha$$

$$d2^2 = dv^2 + yp^2.$$

It can be derived that:

$$d2 = \sqrt{d1^2 + B^2 - 2*B*d1*\frac{\sqrt{x1^2 + f1^2}}{\sqrt{x1^2 + y1^2 + f1^2}}*\cos\alpha},$$

Setting $$k1 = 2*\frac{\sqrt{x1^2 + f1^2}}{\sqrt{x1^2 + y1^2 + f1^2}}*\cos\alpha,$$

and then $$d2 = \sqrt{d1^2 + B^2 - k1*B*d1}$$

It can be seen that the value of k1 is uniquely determined for a certain determined pixel point position (x1, y1).

Then in accordance with the triangle relationship, there is:

$$\frac{\tan\alpha}{\tan\beta} = \frac{B - dr*\cos\alpha}{dr*\cos\alpha}$$

$$\tan\beta = \frac{dr*\sin\alpha}{B - dr*\cos\alpha}$$

$$x2 = -\frac{f2}{\tan\beta} = f2*\left(\cot\alpha - \frac{B}{\sin\alpha}*\frac{\sqrt{x1^2 + y1^2 + f1^2}}{d1*\sqrt{x1^2 + f1^2}}\right)$$

Setting $k2 = f2*\cot\alpha$, $$k3 = f2*\frac{B}{\sin\alpha}*\frac{\sqrt{x1^2 + y1^2 + f1^2}}{\sqrt{x1^2 + f1^2}},$$

and then:

$$x2 = k2 - \frac{k3}{d1}.$$

It can be seen that k2 and k3 are uniquely determined for the determined pixel point (x1, y1).

Then, in accordance with the triangle relationship, there is:

$$\frac{yp}{dr*\sin\alpha} = \frac{y2}{f2}$$

$$y2 = \frac{yp}{dr*\sin\alpha}*f2 = \frac{y1}{\sin\alpha*\sqrt{x1^2 + f1^2}}*f2,$$

Setting $$k4 = \frac{y1}{\sin\alpha*\sqrt{x1^2 + f1^2}}*f2,$$

and it can be seen that k4 is uniquely determined for the determined pixel point (x1, y1).

In conclusion, it can be summarized as follows: for a pixel point (x1, y1) with a depth value d1 in the camera coordinate system corresponding to a real depth camera, the mapping pixel point thereof in the camera coordinate system corresponding to a virtual depth camera is (x2, y2) with a depth value of d2. The following relationship can be obtained:

$$\begin{cases} d2 = \sqrt{d1^2 + B^2 - k1*B*d1} \\ x2 = k2 - \frac{k3}{d1} \\ y2 = k4 \end{cases}$$

Wherein, for the pixel point with a coordinate of (x1, y1), coefficients k1, k2, k3 and k4 are uniquely determined, as shown in the following equations:

$$\begin{cases} k1 = 2*\frac{\sqrt{x1^2 + f1^2}}{\sqrt{x1^2 + y1^2 + f1^2}}*\cos\alpha \\ k2 = f2*\cot\alpha \\ k3 = f2*\frac{B}{\sin\alpha}*\frac{\sqrt{s1^2 + y1^2 + f1^2}}{\sqrt{x1^{21} + f1^2}} \\ k4 = \frac{y1}{\sin\alpha*\sqrt{x1^2 + f1^2}}*f2 \\ \alpha = \begin{cases} \theta - \arctan\left(\frac{f1}{x1}\right) + 180° & x1 > 0 \\ \theta + 90° & x1 = 0 \\ \theta - \arctan\left(\frac{f1}{x1}\right) & x1 < 0 \end{cases} \end{cases}$$

In accordance with the above derivation process for the relational expressions, in a specific implementation of the present application, the information of each pixel point in each of the depth images to be synthesized at least includes an absolute distance depth component; in this case, the obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles, comprises:

in case that a lens optical center of a real depth camera is located at left side of the lens optical center of the virtual depth camera, an obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1 * B * d1} \\ x2 = k2 - \dfrac{k3}{d1} \\ y2 = k4 \end{cases},$$

wherein, $$\begin{cases} k1 = 2 * \dfrac{\sqrt{x1^2 + f1^2}}{\sqrt{x1^2 + y1^2 + f1^2}} * \cos\alpha \\ k2 = f2 * \cot\alpha \\ k3 = f2 * \dfrac{B}{\sin\alpha} * \dfrac{\sqrt{s1^2 + y1^2 + f1^2}}{\sqrt{x1^{21} + f1^2}} \\ k4 = \dfrac{y1}{\sin\alpha * \sqrt{x1^2 + f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; d2 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera, i.e. the angle between the x-axis in the camera coordinate system corresponding to the real depth camera and the x-axis in the camera coordinate system corresponding to the virtual depth camera.

Figure 3B:
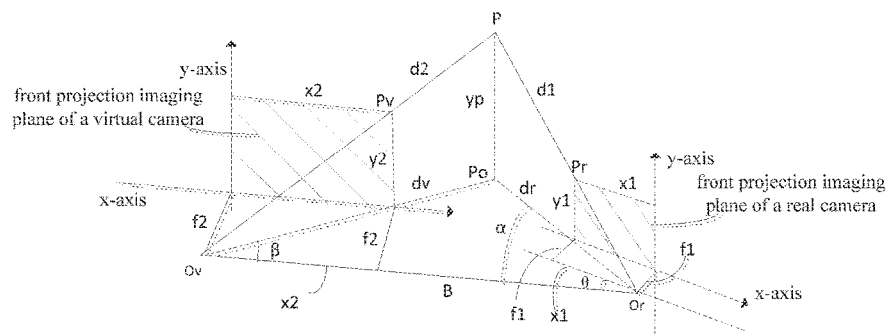
FIG. 3b is another projection relationship diagram between a real depth camera and a virtual depth camera provided by an embodiment of the present application.

When a lens optical center of a real depth camera is located at right side of the lens optical center of the virtual depth camera, the projection relationship between the real depth cameras and the virtual depth camera is similar. Reference to FIG. 3b, another mapping relationship between a real depth camera and a virtual depth camera is provided. The projection relationship diagram is directed to one real depth camera and one virtual depth camera, and the lens optical center of this real depth camera is located on the right side of the lens optical center of the virtual depth camera.

Specifically, referring to the process for deriving the mapping relationship between a pixel point in the camera coordinate system corresponding to a real depth camera and a pixel point in the camera coordinate system corresponding to the virtual depth camera in accordance with FIG. 3a, it is possible to derive the mapping relationship between a pixel point in the camera coordinate system corresponding to a real depth camera and a pixel point in the camera coordinate system corresponding to a virtual depth camera, when the lens optical center of the real depth camera is located on right side of the lens optical center of the virtual depth camera, which will not be described in detail here.

In case that a lens optical center of a real depth camera is located at right side of the lens optical center of the virtual depth camera, an obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1 * B * d1} \\ x2 = -k2 + \dfrac{k3}{d1} \\ y2 = k4 \end{cases},$$

wherein, $$\begin{cases} k1 = 2 * \dfrac{\sqrt{x1^2 + f1^2}}{\sqrt{x1^2 + y1^2 + f1^2}} * \cos\alpha \\ k2 = f2 * \cot\alpha \\ k3 = f2 * \dfrac{B}{\sin\alpha} * \dfrac{\sqrt{x1^2 + y1^2 + f1^2}}{\sqrt{x1^{21} + f1^2}} \\ k4 = \dfrac{y1}{\sin\alpha * \sqrt{x1^2 + f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}.$$

Besides the aforesaid two cases that the lens optical centers of the real depth cameras are located on left side or right side of the lens optical center of the virtual depth camera, a lens optical center of a real depth camera may also overlap with the lens optical center of the virtual depth camera. In this case, the distance between the lens optical center of this real depth camera and the lens optical center of the virtual depth camera is 0; the obtained mapping relationship between pixel points in the camera coordinate system corresponding to this real depth camera and pixel points in the camera coordinate system corresponding to the virtual depth camera is as follow:

$$\begin{cases} d2 = d1 \\ x2 = k2 \\ y2 = k4 \end{cases},$$

-continued wherein, $$\begin{cases} k2 = f2 * \cot\alpha \\ k4 = \dfrac{y1}{\sin\alpha * \sqrt{x1^2 + f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}$$

Specifically, after coefficients k1, k2, k3, k4 and α corresponding to any pixel point (x1, y1) in the camera coordinate systems corresponding to the real depth cameras are calculated, these coefficients can be stored in a data table. When the depth image is synthesized, the required coefficients can be directly obtained from this data table without repeating the aforesaid process for deriving relational expressions, thus, the efficiency of synthesizing depth images can be improved greatly.

Furthermore, it can be seen from the above relational expressions that $$-2 \le k1 = 2 * \dfrac{\sqrt{x1^2 + f1^2}}{\sqrt{x1^2 + y1^2 + f1^2}} * \cos\alpha \le 2,$$

thus:

$$d1 - B \le d2 = \sqrt{d1^2 + B^2 - k1*B*d1} \, d1 + B.$$

When B is sufficiently small, it can be regarded that d2=d1, and in this way, the aforesaid obtained mapping relationship can be simplified further.

Figure 4:
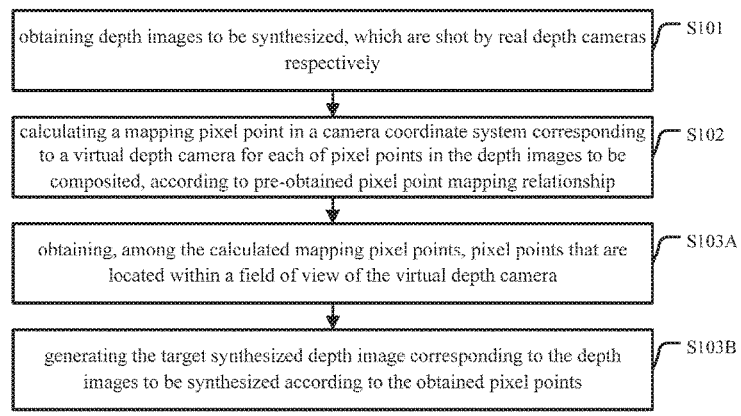
FIG. 4 is a schematic flowchart of another method for synthesizing depth images provided by an embodiment of the present application.

In another specific implementation of the present application, reference to FIG. 4, a schematic flowchart of another method for synthesizing depth images is provided. Compared to the aforesaid embodiments, in the present embodiment, the S103 of generating a target synthesized depth image corresponding to the depth images to be synthesized, according to the calculated mapping pixel points includes:

S103A: obtaining, among the calculated mapping pixel points, pixel points that are located within a field of view of the virtual depth camera.

Although depth images with a large field of view can be obtained after image synthesizing of the respective depth images to be synthesized, the field of view of the synthesized depth image is not a simple addition of fields of view of the respective depth images to be synthesized. The field of view of the virtual depth camera is determined according to the lens optical center position of the virtual depth camera and fields of view of the real depth cameras.

Figure 5A:
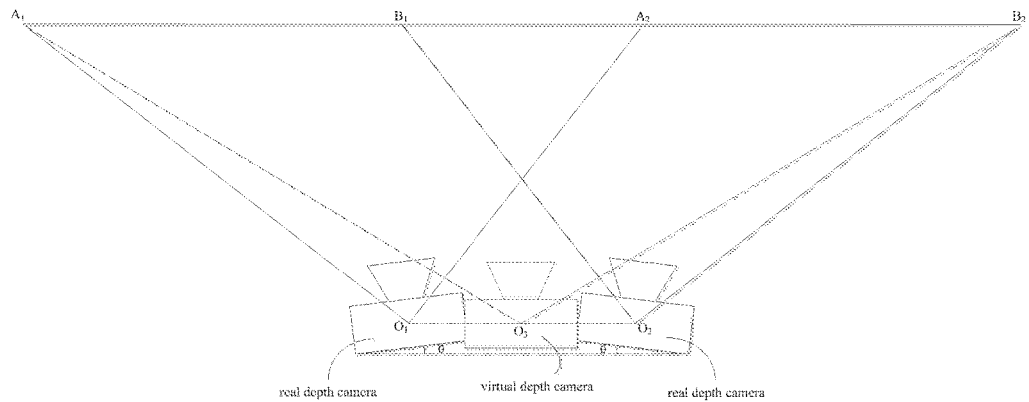
FIG. 5a is a schematic diagram of a field of view of a virtual depth camera provided by an embodiment of the present application.

Specifically, reference to FIG. 5a, a schematic diagram of a field of view of a virtual depth camera is provided. In this figure, the lens optical center $O_3$ of the virtual depth camera is located in center of the connecting line of the lens optical centers $O_1$ and $O_2$ of two real depth cameras, wherein the fields of view of the two real depth cameras are a region formed by the line segment $O_1A_1$ and the line segment $O_1A_2$, and a region formed by the line segment $O_2B_1$ and the line segment $O_2B_2$ respectively; and the field of view of the virtual depth camera is the region formed by the line segment $O_3A_1$ and the line segment $O_3B_2$.

Figure 5B:
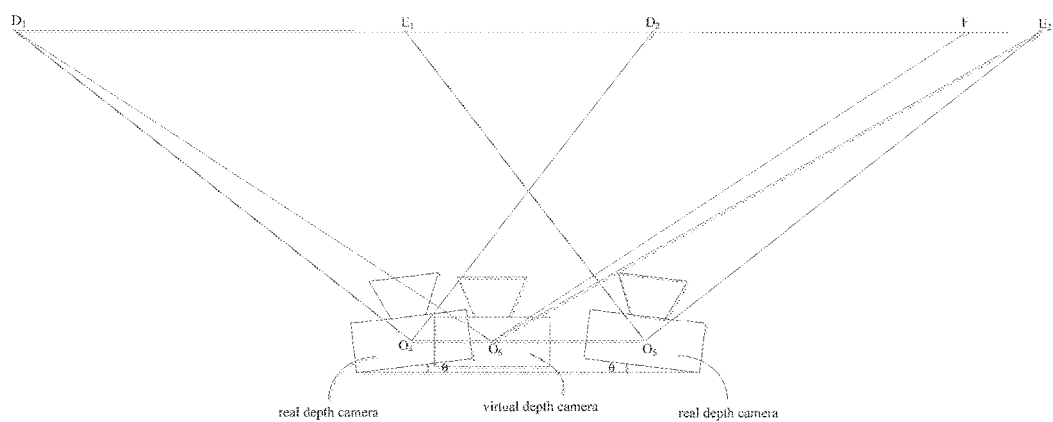
FIG. 5b is a schematic diagram of another field of view of a virtual depth camera provided by an embodiment of the present application.

Reference to FIG. 5b, a schematic diagram of another field of view of a virtual depth camera is provided. In this figure, the lens optical center $O_6$ of the virtual depth camera is not located in the center of the connecting line of the lens optical centers $O_4$ and $O_5$ of two real depth cameras, wherein the fields of view of the two real depth cameras are a region formed by the line segment $O_4D_1$ and the line segment $O_4D_2$. and a region formed by the line segment $O_5E_1$ and the line segment $O_5E_2$ respectively; as the line segment $O_6D_1$ and the line segment $O_6E_2$ are in an asymmetric relationship, the field of view of the virtual depth camera is not a region formed by the line segment $O_6D_1$ and the line segment $O_6E_2$ but is a region formed by the line segment $O_6D_1$ and the line segment $O_6F$, wherein the line segment $O_6D_1$ and the line segment $O_6F$ are in a symmetric relationship.

In this way, it can be obviously seen from the aforesaid two figures that the field of view of a virtual depth camera is not an addition of the fields of view of two real depth cameras.

S103B: generating the target synthesized depth image corresponding to the depth images to be synthesized according to obtained pixel points.

In a specific implementation of the present application, the information of each pixel point in each of the depth images to be synthesized may further include a confidence component. Wherein, the confidence component represents that there are errors between the depth value output by a depth camera and the true value, and in some depth cameras, the confidence will be used for representing the magnitude of errors between the depth value and the true value. Generally, the larger the confidence is, the smaller the error is. Confidence and depth value are in a one-to-one correspondence, i.e. each pixel point in a depth image has a corresponding depth value as well as a confidence value. Typically, the depth camera that may output confidences includes the ToF depth camera and the like.

It can be understood that, among the obtained pixel points, there may be some pixel points that correspond to the same point in the camera coordinate system corresponding to the virtual depth camera. Among the pixel points corresponding to the same point, the absolute distance depth component and the confidence component can be the identical or different.

Based on the aforesaid condition, when the synthesized target depth image corresponding to the respective depth images to be synthesized is generated according to the obtained pixel points, it is possible to process the obtained pixel points by retaining pixel points in accordance with a rule that a pixel point with the maximum confidence among pixel points that are mapped to a same point in the camera coordinate system corresponding to the virtual depth camera is retained; and then generate the target synthesized depth image corresponding to the depth images to be synthesized according to retained pixel points.

When the target synthesized depth image is obtained with the aforesaid method, the distribution of respective pixel points in the obtained synthesized target depth image is closer to the truth due to the consideration of confidence components of pixel points.

It should be noted that, during the processing of the obtained pixel points by retaining pixel points, it is possible to process all of the obtained pixel points for retaining pixel points, and then generate the target synthesized depth image corresponding to the depth images to be synthesized according to the retained pixel points; alternatively, it is possible to process each of the obtained pixel points in a unit of a pixel point by following operations: processing a pixel point; if this pixel point is retained, storing the retained pixel point into the corresponding position of the synthesized target depth image, and repeating the aforesaid operation until each of the obtained pixel points is traversed. Of course, these are only examples on how to generate the synthesized target depth image corresponding to respective depth images to be synthesized according to the obtained pixel points, for which the present application is not limited.

It can be seen from above that, in the solution provided by the above embodiments of the present application, after the images to be synthesized, which are shot by the real depth cameras respectively, are obtained, the pixel points in the images to be synthesized are mapped into a camera coordinate system corresponding to a virtual depth camera in order to obtain the mapping pixel points in the camera coordinate system corresponding to the virtual depth camera for the pixel points in the images to be synthesized, and a target synthesized depth image corresponding to the depth images to be synthesized is generated according to the obtained mapping pixel points. A depth image synthesized in this way provides intuitive feeling that it is shot by the virtual depth camera. The field of view of the synthesized depth image is larger than that of a single depth image to be synthesized because the synthesized depth image contains the information in the respective depth images to be synthesized.

Corresponding to the aforesaid method for synthesizing depth images, embodiments of the present application further provide a device for synthesizing depth images.

Figure 6:
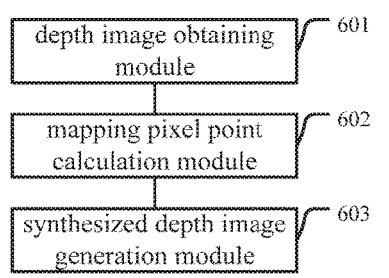
FIG. 6 is a structure diagram of a device for synthesizing depth images provided by an embodiment of the present application.

FIG. 6 is a structural diagram of a device for synthesizing depth images provided by an embodiment of the present application. The device includes:

a depth image obtaining module 601 is configured to obtain depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

a mapping pixel point calculation module 602 is configured to calculate a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and a synthesized depth image generation module 603 is configured to generate a target synthesized depth image corresponding to the depth images to be synthesized, according to calculated mapping pixel points.

Specifically, the device for synthesizing depth images can further include:

a mapping relationship obtaining module is configured to pre-obtain pixel point mapping relationship;

wherein the mapping relationship obtaining module includes:

a lens optical center and focal distance obtaining sub-module is configured to obtaining a lens optical center position of the virtual depth camera and a focal distance of the virtual depth camera;

a distance and angle calculation sub-module is configured to calculate distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and a mapping relationship obtaining sub-module is configured to obtain the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles.

Specifically, information of each pixel point in each of the depth images to be synthesized at least includes an absolute distance depth component;

the mapping relationship obtaining sub-module is specifically configured to:

in case that a lens optical center of a real depth camera is located at left side of the lens optical center of the virtual depth camera, obtain the mapping relationship between pixel points in the camera coordinate system corresponding to this real depth camera and pixel points in the camera coordinate system corresponding to the virtual depth camera as follow:

$$\begin{cases} d2 = \sqrt{d1^2 + B^2 - k1*B*d1} \\ x2 = k2 - \dfrac{k3}{d1} \\ y2 = k4 \end{cases},$$

wherein, $$\begin{cases} k1 = 2*\dfrac{\sqrt{x1^2 + f1^2}}{\sqrt{x1^2 + y1^2 + f1^2}}*\cos\alpha \\ k2 = f2*\cot\alpha \\ k3 = f2*\dfrac{B}{\sin\alpha}*\dfrac{\sqrt{x1^2 + y1^2 + f1^2}}{\sqrt{x1^{21} + f1^2}} \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases},$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; d2 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera;

in case that a lens optical center of a real depth camera is located at right side of the lens optical center of the virtual depth camera, obtain the mapping relationship between pixel points in the camera coordinate system corresponding to this real depth camera and pixel points in the camera coordinate system corresponding to the virtual depth camera as follow:

$$\begin{cases} d2 = \sqrt{d1^2 + B^2 - k1*B*d1} \\ x2 = -k2 + \dfrac{k3}{d1} \\ y2 = k4 \end{cases},$$

wherein, $$\begin{cases} k1 = 2 * \dfrac{\sqrt{x1^2 + f1^2}}{\sqrt{x1^2 + y1^2 + f1^2}} * \cos\alpha \\ k2 = f2 * \cot\alpha \\ k3 = f2 * \dfrac{B}{\sin\alpha} * \dfrac{\sqrt{s1^2 + y1^2 + f1^2}}{\sqrt{x1^{21} + f1^2}} \\ k4 = \dfrac{y1}{\sin\alpha * \sqrt{x1^2 + f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases};$$

in case that a lens optical center of a real depth camera overlaps with the lens optical center of the virtual depth camera, the distance between the lens optical center of this real depth camera and the lens optical center of the virtual depth camera is 0, obtain the mapping relationship between pixel points in the camera coordinate system corresponding to this real depth camera and pixel points in the camera coordinate system corresponding to the virtual depth camera as follow:

$$\begin{cases} d2 = d1 \\ x2 = k2 \\ y2 = k4 \end{cases},$$

wherein, $$\begin{cases} k2 = f2 * \cot\alpha \\ k4 = \dfrac{y1}{\sin\alpha * \sqrt{x1^2 + f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}.$$

Figure 7:
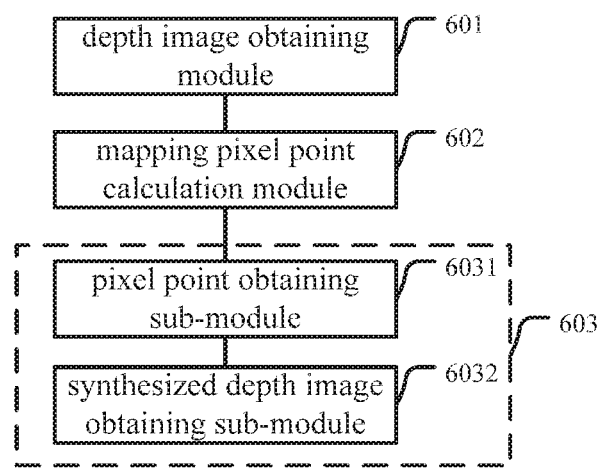
FIG. 7 is a structure diagram of another device for synthesizing depth images provided by an embodiment of the present application.

In a specific implementation of the present application, reference to FIG. 7, a structure diagram of another device for synthesizing depth images is provided. Compared to the aforesaid embodiment, in the present embodiment, the synthesized depth image generation module 603 includes:

a pixel point obtaining sub-module 6031 is configured to obtain, among the calculated mapping pixel points, pixel points that are located within a field of view of the virtual depth camera, wherein the field of view of the virtual depth camera is determined according to the lens optical center position of the virtual depth camera and fields of view of the real depth cameras; and a synthesized depth image obtaining sub-module 6032 is configured to generate the target synthesized depth image corresponding to the depth images to be synthesized according to obtained pixel points.

Specifically, the information of each pixel point in each of the depth images to be synthesized further includes a confidence component;

the synthesized depth image obtaining sub-module 6032 can include:

a pixel point retaining processing unit is configured to process the obtained pixel points by retaining pixel points in accordance with a rule that a pixel point with the maximum confidence among pixel points that are mapped to a same point in the camera coordinate system corresponding to the virtual depth camera is retained; and; and a synthesized depth image obtaining unit is configured to generate the target synthesized depth image corresponding to the depth images to be synthesized according to retained pixel points.

It can be seen from above that, in the solution provided by the above embodiments of the present application, after the images to be synthesized, which are shot by the real depth cameras respectively, are obtained, the pixel points in the images to be synthesized are mapped into a camera coordinate system corresponding to a virtual depth camera in order to obtain the mapping pixel points in the camera coordinate system corresponding to the virtual depth camera for the pixel points in the images to be synthesized, and a target synthesized depth image corresponding to the depth images to be synthesized is generated according to the obtained mapping pixel points. A depth image synthesized in this way provides intuitive feeling that it is shot by the virtual depth camera. The field of view of the synthesized depth image is larger than that of a single depth image to be synthesized because the synthesized depth image contains the information in the respective depth images to be synthesized.

Figure 8:
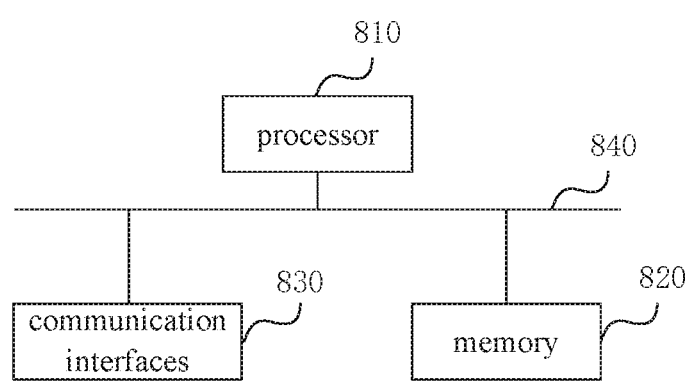
FIG. 8 is a structure diagram of a terminal provided by an embodiment of the present application.

Furthermore, the embodiments of the present application further provide a terminal. Reference to FIG. 8, a structure diagram of a terminal is provided. The terminal includes:

a processor 810, a memory 820, communication interfaces 830 and a bus 840;

wherein the processor 810, the memory 820 and the communication interfaces 830 are connected and communicated with each other via the bus 840;

the memory 820 is configured to store executable program codes;

the processor 810 is configured to execute the executable program codes stored in the memory 820 so as to perform:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

There exists a variety of forms for this terminal, which include but are not limited to:

(1) a mobile communication equipment: this kind of equipment is characterized in ability of mobile communication and mainly aims to provide voice and data communication. This kind of terminal includes: smartphone (e.g. IPHONE), multimedia phones, functional phones and low end phones and the like.

(2) an ultra-mobile personal computer equipment: this kind of equipment belongs to the category of personal computers, which has functions of computing and possessing and generally possesses mobile networking property. This kind of terminal includes: PDA, MID and UMPC equipment and the like, for example IPAD.

(3) a portable entertainment equipment: this kind of equipment can display and play multimedia content. This kind of equipment includes: audio and video players (for example, iPods), handheld game consoles, e-books readers and intelligent toys and portable vehicle navigation equipment.

(4) a server: an equipment providing computing service, the server is constituted by processors, hard disks, internal storages, system buses and the like; servers are of a architecture similar to that of common computers, but of higher requirements on processing capacity, stability, reliability, safety, expandability, manageability and the like due to the requirement for highly reliable service.

(5) other electric devices with data exchange function.

It can be seen from above that, in the solution provided by the aforesaid respective embodiments, after a terminal obtains the images to be synthesized which are taken by respective real depth cameras, the pixel points in the images to be synthesized are mapped into the camera coordinate system corresponding to the virtual depth camera, in order to obtain the mapping pixel points, in the camera coordinate system corresponding to the virtual depth camera, of the respective pixel points in the respective images to be synthesized, and a synthesized target depth image corresponding to the respective depth images to be synthesized is generated according to the obtained mapping pixel points. A depth image synthesized in this way by a terminal makes an intuitive sense that it is taken by the virtual depth camera, and the field of view of the synthesized depth image is larger than that of a single depth image to be synthesized as the synthesized depth image contains information on respective depth images to be synthesized.

The embodiments of the present application further provide an application program, which is configured to carry out the method for synthesizing depth images provided by the embodiments of the present application during operation, wherein the method includes:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

It can be seen from above that, in the solution provided by the present embodiment, the above application program can be executed so as to, after the images to be synthesized, which are shot by the real depth cameras respectively, are obtained, map the pixel points in the images to be synthesized into a camera coordinate system corresponding to a virtual depth camera in order to obtain the mapping pixel points in the camera coordinate system corresponding to the virtual depth camera for the pixel points in the images to be synthesized; and generate a target synthesized depth image corresponding to the depth images to be synthesized according to the obtained mapping pixel points. A depth image synthesized in this way provides intuitive feeling that it is shot by the virtual depth camera. The field of view of the synthesized depth image is larger than that of a single depth image to be synthesized because the synthesized depth image contains the information in the respective depth images to be synthesized.

The embodiments of the present application further provide a storage medium which is configured to store executable program codes. The executable program codes are executed so as to perform the method for synthesizing depth images provided by the embodiments of the present application, wherein the method includes:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

It can be seen from above that, in the solution provided by the present embodiment, the above executable program codes stored in the storage medium can be executed so as to, after the images to be synthesized, which are shot by the real depth cameras respectively, are obtained, map the pixel points in the images to be synthesized into a camera coordinate system corresponding to a virtual depth camera in order to obtain the mapping pixel points in the camera coordinate system corresponding to the virtual depth camera for the pixel points in the images to be synthesized; and generate a target synthesized depth image corresponding to the depth images to be synthesized according to the obtained mapping pixel points. A depth image synthesized in this way provides intuitive feeling that it is shot by the virtual depth camera. The field of view of the synthesized depth image is larger than that of a single depth image to be synthesized because the synthesized depth image contains the information in the respective depth images to be synthesized.

The device, the terminal, the application program and the storage medium in the embodiments of are described in a concise manner since they are essentially similar to the embodiments of a method, and the related parts could refer to the parts of the description of embodiments of a method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements include not only those elements listed, but also other elements not specifically listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

Those ordinary skill in the art can understand that all or parts of the steps in the above method embodiments can be accomplished through programs instructing related hardware. The programs can be stored in a computer-readable storage medium, such as ROM/RAM, magnetic disc, optical disk and the like.

The embodiments described above are just specific embodiments of the present application, and not indented to limit the present application. Any modifications, alternatives, improvements or the like within the spirit and principle of the present application shall be included in the protection scope of the present application.

The invention claimed is:

1. A method for synthesizing depth images, comprising:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

2. The method according to claim 1, wherein the pixel point mapping relationship is pre-obtained by:

obtaining a lens optical center position of the virtual depth camera and a focal distance of the virtual depth camera;

calculating distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles.

3. The method according to claim 2, wherein, information of each pixel point in each of the depth images to be synthesized at least comprises an absolute distance depth component;

the obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and the calculated distances and angles, comprises:

in case that a lens optical center of a real depth camera is located at left side of the lens optical center of the virtual depth camera, an obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1*B*d1} \\ x2 = k2 - \dfrac{k3}{d1} \\ y2 = k4 \end{cases},$$

wherein, $$\begin{cases} k1 = 2*\dfrac{\sqrt{x1^2 + f1^2}}{\sqrt{x1^2 + y1^2 + f1^2}}*\cos\alpha \\ k2 = f2*\cot\alpha \\ k3 = f2*\dfrac{B}{\sin\alpha}*\dfrac{\sqrt{s1^2 + y1^2 + f1^2}}{\sqrt{x1^{21} + f1^2}} \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases},$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; y22 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera;

in case that a lens optical center of a real depth camera is located at right side of the lens optical center of the virtual depth camera, the obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1*B*d1} \\ x2 = -k2 + \dfrac{k3}{d1} \\ y2 = k4 \end{cases},$$

wherein, $$\begin{cases} k1 = 2*\dfrac{\sqrt{x1^2 + f1^2}}{\sqrt{x1^2 + y1^2 + f1^2}}*\cos\alpha \\ k2 = f2*\cot\alpha \\ k3 = f2*\dfrac{B}{\sin\alpha}*\dfrac{\sqrt{s1^2 + y1^2 + f1^2}}{\sqrt{x1^{21} + f1^2}} \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases};$$

in case that a lens optical center of a real depth camera overlaps with the lens optical center of the virtual depth camera, the distance between the lens optical center of this real depth camera and the lens optical center of the virtual depth camera is 0, the obtained mapping relationship between pixel points in the camera coordinate system corresponding to this real depth camera and pixel points in the camera coordinate system corresponding to the virtual depth camera is as follow:

$$\begin{cases} d2 = d1 \\ x2 = k2 \\ y2 = k4 \end{cases},$$

wherein, $$\begin{cases} k2 = f2*\cot\alpha \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}.$$

4. The method according to claim 1, wherein the generating a target synthesized depth image corresponding to the depth images to be synthesized, according to the calculated mapping pixel points, comprises:

obtaining, among the calculated mapping pixel points, pixel points that are located within a field of view of the virtual depth camera, wherein the field of view of the virtual depth camera is determined according to the lens optical center position of the virtual depth camera and fields of view of the real depth cameras; and generating the target synthesized depth image corresponding to the depth images to be synthesized according to obtained pixel points.

5. The method according to claim 4, wherein, the information of each pixel point in each of the depth images to be synthesized further comprises a confidence component;

the generating the target synthesized depth image corresponding to the depth images to be synthesized according to the obtained pixel points comprises:

processing the obtained pixel points by retaining pixel points in accordance with a rule that a pixel point with the maximum confidence among pixel points that are mapped to a same point in the camera coordinate system corresponding to the virtual depth camera is retained; and generating the target synthesized depth image corresponding to the depth images to be synthesized according to retained pixel points.

6. A terminal, comprising:

a processor, a memory, communication interfaces and a bus;

wherein the processor, the memory and the communication interfaces are connected and communicated with each other via the bus;

the memory is configured to store executable program codes;

the processor is configured to execute the executable program codes stored in the memory to perform:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

7. The terminal according to claim 6, wherein the pixel point mapping relationship is pre-obtained by:

obtaining a lens optical center position of the virtual depth camera and a focal distance of the virtual depth camera;

calculating distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and calculated distances and angles.

8. The terminal according to claim 7, wherein, information of each pixel point in each of the depth images to be synthesized at least comprises an absolute distance depth component;

the obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and the calculated distances and angles, comprises:

in case that a lens optical center of a real depth camera is located at left side of the lens optical center of the virtual depth camera, an obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1*B*d1} \\ x2 = k2 - \dfrac{k3}{d1} \\ y2 = k4 \end{cases},$$

wherein, $$\begin{cases} k1 = 2*\dfrac{\sqrt{x1^2 + f1^2}}{\sqrt{x1^2 + y1^2 + f1^2}}*\cos\alpha \\ k2 = f2*\cot\alpha \\ k3 = f2*\dfrac{B}{\sin\alpha}*\dfrac{\sqrt{s1^2 + y1^2 + f1^2}}{\sqrt{x1^{21} + f1^2}} \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases},$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; d2 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera;

in case that a lens optical center of a real depth camera is located at right side of the lens optical center of the virtual depth camera, the obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1*B*d1} \\ x2 = -k2 + \dfrac{k3}{d1} \\ y2 = k4 \end{cases},$$

wherein, $$\begin{cases} k1 = 2*\dfrac{\sqrt{x1^2 + f1^2}}{\sqrt{x1^2 + y1^2 + f1^2}}*\cos\alpha \\ k2 = f2*\cot\alpha \\ k3 = f2*\dfrac{B}{\sin\alpha}*\dfrac{\sqrt{s1^2 + y1^2 + f1^2}}{\sqrt{x1^{21} + f1^2}} \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases};$$

in case that a lens optical center of a real depth camera overlaps with the lens optical center of the virtual depth camera, the distance between the lens optical center of this real depth camera and the lens optical center of the virtual depth camera is 0, the obtained mapping relationship between pixel points in the camera coordinate system corresponding to this real depth camera and pixel points in the camera coordinate system corresponding to the virtual depth camera is as follow:

$$\begin{cases} d2 = d1 \\ x2 = k2 \\ y2 = k4 \end{cases},$$

wherein, $$\begin{cases} k2 = f2*\cot\alpha \\ k4 = \dfrac{y1}{\sin\alpha*\sqrt{x1^2 + f1^2}}*f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}$$

9. The terminal according to claim 6, wherein the generating a target synthesized depth image corresponding to the depth images to be synthesized, according to the calculated mapping pixel points, comprises:

obtaining, among the calculated mapping pixel points, pixel points that are located within a field of view of the virtual depth camera, wherein the field of view of the virtual depth camera is determined according to the lens optical center position of the virtual depth camera and fields of view of the real depth cameras; and generating the target synthesized depth image corresponding to the depth images to be synthesized according to obtained pixel points.

10. The terminal according to claim 9, wherein, the information of each pixel point in each of the depth images to be synthesized further comprises a confidence component;

the generating the target synthesized depth image corresponding to the depth images to be synthesized according to the obtained pixel points comprises:

processing the obtained pixel points by retaining pixel points in accordance with a rule that a pixel point with the maximum confidence among pixel points that are mapped to a same point in the camera coordinate system corresponding to the virtual depth camera is retained; and generating the target synthesized depth image corresponding to the depth images to be synthesized according to retained pixel points.

11. A storage medium, wherein the storage medium is configured to store executable program codes which are executed so as to synthesize depth images, wherein the executable program codes are executed to perform:

obtaining depth images to be synthesized, which are shot by real depth cameras respectively, wherein a position relationship between the real depth cameras when shooting the depth images to be synthesized respectively is that: y-axes of respective camera coordinate systems of the real depth cameras are parallel to each other;

calculating a mapping pixel point in a camera coordinate system corresponding to a virtual depth camera for each of pixel points in the depth images to be synthesized, according to pre-obtained pixel point mapping relationship, wherein camera parameters of the virtual depth camera are determined according to camera parameters of the real depth cameras, a lens optical center of the virtual depth camera is located in a connecting line of lens optical centers of the real depth cameras, an x-axis of the camera coordinate system corresponding to the virtual depth camera is parallel to the connecting line of lens optical centers of the real depth cameras, the pre-obtained pixel point mapping relationship is a mapping relationship between pixel points in a camera coordinate system corresponding to each of the real depth cameras and pixel points in the camera coordinate system corresponding to the virtual depth camera, which is pre-obtained according to a geometrical relationship between the camera parameters of the real depth cameras and the camera parameters of the virtual depth camera; and generating a target synthesized depth image corresponding to the depth images to be synthesized, according to calculated mapping pixel points.

12. The storage medium according to claim 11, wherein the pixel point mapping relationship is pre-obtained by:

obtaining a lens optical center position of the virtual depth camera and a focal distance of the virtual depth camera;

calculating distances between the real depth cameras and the virtual depth camera and angles between imaging planes of the real depth cameras and an imaging plane of the virtual depth camera, according to the lens optical center position of the virtual depth camera and the lens optical center positions of the real depth cameras; and obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and the calculated distances and angles.

13. The storage medium according to claim 12, information of each pixel point in each of the depth images to be synthesized at least comprises an absolute distance depth component;

the obtaining the mapping relationship between pixel points in the camera coordinate system corresponding to each of the real depth cameras and pixel points in the camera coordinate system corresponding to the virtual depth camera by utilizing the geometrical relationship, according to a relative position relationship between the lens optical centers of the real depth cameras and the lens optical center of the virtual depth camera, a focal distance of the virtual depth camera, focal distances of the real depth cameras and the calculated distances and angles:

in case that a lens optical center of a real depth camera is located at left side of the lens optical center of the virtual depth camera, an obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1*B*d1} \\ x2 = k2 - \dfrac{k3}{d1} \\ y2 = k4 \end{cases},$$

wherein, $$\begin{cases} k1 = 2*\dfrac{\sqrt{x1^2+f1^2}}{\sqrt{x1^2+y1^2+f1^2}}*\cos\alpha \\ k2 = f2*\cot\alpha \\ k3 = f2*\dfrac{B}{\sin\alpha}*\dfrac{\sqrt{s1^2+y1^2+f1^2}}{\sqrt{x1^{21}+f1^2}} \\ k4 = \dfrac{y1}{\sin\alpha*\sqrt{x1^2+f1^2}}*f2 \\ \alpha = \begin{cases} \theta - \arctan\left(\dfrac{f1}{x1}\right)+180° & x1>0 \\ \theta + 90° & x1 = 0 \\ \theta - \arctan\left(\dfrac{f1}{x1}\right) & x1<0 \end{cases} \end{cases},$$

x1, y1 respectively represent an abscissa and an ordinate of a pixel point in the camera coordinate system corresponding to a real depth camera; x2, y2 respectively represent an abscissa and an ordinate of a mapping pixel point in the camera coordinate system corresponding to the virtual depth camera for a pixel point with coordinates of (x1, y1) in the camera coordinate system corresponding to the real depth camera; d1 represents an absolute distance depth component value of the pixel point with coordinates of (x1, y1) in the camera coordinate system corresponding to the real depth camera; d2 represents an absolute distance depth component value of the pixel point with coordinates of (x2, y2) in the camera coordinate system corresponding to the virtual depth camera; B represents a distance between the lens optical center of the real depth camera and the lens optical center of the virtual depth camera; f1 represents the focal distance of the real depth camera; f2 represents the focal distance of the virtual depth camera; and θ represents angle between the imaging plane of the real depth camera and the imaging plane of the virtual depth camera;

in case that a lens optical center of a real depth camera is located at right side of the lens optical center of the virtual depth camera, the obtained mapping relationship between pixel points in the camera coordinate system corresponding to this real depth camera and pixel points in the camera coordinate system corresponding to the virtual depth camera is as follow:

$$\begin{cases} d2 = \sqrt{d1^2 + B^2 - k1*B*d1} \\ x2 = -k2 + \dfrac{k3}{d1} \\ y2 = k4 \end{cases},$$

-continued wherein, $$\begin{cases} k1 = 2 * \dfrac{\sqrt{x1^2+f1^2}}{\sqrt{x1^2+y1^2+f1^2}} * \cos\alpha \\ k2 = f2 * \cot\alpha \\ k3 = f2 * \dfrac{B}{\sin\alpha} * \dfrac{\sqrt{s1^2+y1^2+f1^2}}{\sqrt{x1^{21}+f1^2}} \\ k4 = \dfrac{y1}{\sin\alpha * \sqrt{x1^2+f1^2}} * f2 \end{cases};$$

$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

in case that a lens optical center of a real depth camera overlaps with the lens optical center of the virtual depth camera, the distance between the lens optical center of this real depth camera and the lens optical center of the virtual depth camera is 0, the obtained mapping relationship between pixel points in the camera coordinate system corresponding to this real depth camera and pixel points in the camera coordinate system corresponding to the virtual depth camera is as follow:

$$\begin{cases} d2 = d1 \\ x2 = k2 \\ y2 = k4 \end{cases},$$

-continued wherein, $$\begin{cases} k2 = f2 * \cot\alpha \\ k4 = \dfrac{y1}{\sin\alpha * \sqrt{x1^2+f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases}$$

14. The storage medium according to claim 11, wherein the generating a target synthesized depth image corresponding to the depth images to be synthesized, according to the calculated mapping pixel points, comprises:
obtaining, among the calculated mapping pixel points, pixel points that are located within a field of view of the virtual depth camera, wherein the field of view of the virtual depth camera is determined according to the lens optical center position of the virtual depth camera and fields of view of the real depth cameras; and
generating the target synthesized depth image corresponding to the depth images to be synthesized according to obtained pixel points.

15. The storage medium according to claim 14, wherein, the information of each pixel point in each of the depth images to be synthesized further comprises a confidence component;
the generating the target synthesized depth image corresponding to the depth images to be synthesized according to the obtained pixel points comprises:
processing the obtained pixel points by retaining pixel points in accordance with a rule that a pixel point with the maximum confidence among pixel points that are mapped to a same point in the camera coordinate system corresponding to the virtual depth camera is retained; and
generating the target synthesized depth image corresponding to the depth images to be synthesized according to retained pixel points.

* * * * *

UNITED STATES PATENT AND TRADEMARK OFFICE
CERTIFICATE OF CORRECTION

PATENT NO. : 10,447,989 B2
APPLICATION NO. : 15/775593
DATED : October 15, 2019
INVENTOR(S) : Shiliang Pu et al.

Page 1 of 7

It is certified that error appears in the above-identified patent and that said Letters Patent is hereby corrected as shown below:

In the Specification

At Column 3, Line 9, the portion of the formula reading $\dfrac{\sqrt{s1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$ At Column 3, Line 56, the portion of the formula reading $\dfrac{\sqrt{x1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$ At Column 6, Line 19, the portion of the formula reading $\dfrac{\sqrt{x1^2 + y1^2 + f1^2}}{\sqrt{x1^{21} + f1^2}}$ Signed and Sealed this
Twenty-first Day of January, 2020

Andrei Iancu
*Director of the United States Patent and Trademark Office*

CERTIFICATE OF CORRECTION (continued)
U.S. Pat. No. 10,447,989 B2

Should read: $$\frac{\sqrt{x1^2 + y1^2 + f1^2}}{\sqrt{x1^2 + f1^2}}$$

At Column 6, Line 23, the formula reading $$\alpha = \begin{cases} \theta - \arctan\left(\frac{f1}{x1}\right) + 180° & x1 > 0 \\ \theta + 90° & x1 = 0 \\ \theta - \arctan\left(\frac{f1}{x1}\right) & x1 < 0 \end{cases}$$

$$\alpha = \begin{cases} \theta + arctan\left(\frac{f1}{x1}\right) & x1 > 0 \\ \theta + 90° & x1 = 0 \\ \theta + arctan\left(\frac{f1}{x1}\right) + 180° & x1 < 0 \end{cases}.$$

Should read:

At Column 7, Line 9, the portion of the formula reading $$\frac{\sqrt{x1^2 + y1^2 + f1^2}}{\sqrt{x1^{21} + f1^2}}$$

Should read: $$\frac{\sqrt{x1^2 + y1^2 + f1^2}}{\sqrt{x1^2 + f1^2}}$$

$$\alpha = \alpha = \begin{cases} \theta - \arctan\left(\frac{f1}{x1}\right) + 180° & x1 > 0 \\ \theta + 90° & x1 = 0 \\ \theta - \arctan\left(\frac{f1}{x1}\right) & x1 < 0 \end{cases}.$$

At Column 13, Line 5, the formula reading

CERTIFICATE OF CORRECTION (continued)  
U.S. Pat. No. 10,447,989 B2

Should read:
$$\alpha = \begin{cases} \theta + \arctan\left(\frac{f1}{x1}\right) & x1 > 0 \\ \theta + 90° & x1 = 0 \\ \theta + \arctan\left(\frac{f1}{x1}\right) + 180° & x1 < 0 \end{cases}.$$

At Column 15, Line 19, the portion of the formula reading $\dfrac{\sqrt{s1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$ At Column 15, Line 23, the formula reading
$$\alpha = \begin{cases} \theta - \arctan\left(\frac{f1}{x1}\right) + 180° & x1 > 0 \\ \theta + 90° & x1 = 0 \\ \theta - \arctan\left(\frac{f1}{x1}\right) & x1 < 0 \end{cases}.$$

Should read:
$$\alpha = \begin{cases} \theta + \arctan\left(\frac{f1}{x1}\right) & x1 > 0 \\ \theta + 90° & x1 = 0 \\ \theta + \arctan\left(\frac{f1}{x1}\right) + 180° & x1 < 0 \end{cases}.$$

At Column 16, Line 37, the portion of the formula reading $\dfrac{\sqrt{x1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$

CERTIFICATE OF CORRECTION (continued)
U.S. Pat. No. 10,447,989 B2

At Column 17, Line 34, reading $d1-B \leq d2 = \sqrt{d1^2+B^2-k1*B*d1}d1+B.$

Should read: $d1 - B \leq d2 = \sqrt{d1^2 + B^2 - k1 * B * d1} \leq d1 + B.$

At Column 20, Line 51, the portion of the formula reading $\dfrac{\sqrt{x1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$ At Column 20, Line 56, the formula reading 
$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

Should read:
$$\alpha = \begin{cases} \theta + \arctan\left(\dfrac{f1}{x1}\right) & x1 > 0 \\ \theta + 90° & x1 = 0 \\ \theta + \arctan\left(\dfrac{f1}{x1}\right) + 180° & x1 < 0 \end{cases}.$$

At Column 21, Line 40, the portion of the formula reading $\dfrac{\sqrt{s1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$

In the Claims

At Column 27, Line 39, the portion of the formula reading $\dfrac{\sqrt{s1^2+y1^2+f1^2}}{\sqrt{x1^{21}+f1^2}}$ Should read: $\dfrac{\sqrt{x1^2+y1^2+f1^2}}{\sqrt{x1^2+f1^2}}$ At Column 27, Line 44, the formula reading
$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

Should read:
$$\alpha = \begin{cases} \theta + \arctan\left(\dfrac{f1}{x1}\right) & x1 > 0 \\ \theta + 90° & x1 = 0 \\ \theta + \arctan\left(\dfrac{f1}{x1}\right) + 180° & x1 < 0 \end{cases}.$$

At Column 28, Line 26, the portion of the formula reading $\dfrac{\sqrt{s1^2+y1^2+f1^2}}{\sqrt{x1^{21}+f1^2}}$ Should read: $\dfrac{\sqrt{x1^2+y1^2+f1^2}}{\sqrt{x1^2+f1^2}}$ At Column 30, Line 57, the portion of the formula reading $\dfrac{\sqrt{s1^2+y1^2+f1^2}}{\sqrt{x1^{21}+f1^2}}$

CERTIFICATE OF CORRECTION (continued)
U.S. Pat. No. 10,447,989 B2

Should read: $\dfrac{\sqrt{x1^2 + y1^2 + f1^2}}{\sqrt{x1^2 + f1^2}}$

At Column 30, Line 61, the formula reading
$$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

Should read:
$$\alpha = \begin{cases} \theta + \arctan\left(\dfrac{f1}{x1}\right) & x1 > 0 \\ \theta + 90° & x1 = 0 \\ \theta + \arctan\left(\dfrac{f1}{x1}\right) + 180° & x1 < 0 \end{cases}.$$

At Column 31, Line 47, the portion of the formula reading $\dfrac{\sqrt{s1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$ At Column 34, Line 11, the portion of the formula $\dfrac{\sqrt{s1^2 + y1^2 + f1^2}}{\sqrt{x1^{21} + f1^2}}$ Should read: $\dfrac{\sqrt{x1^2 + y1^2 + f1^2}}{\sqrt{x1^2 + f1^2}}$ At Column 34, Line 16, the formula reading $$\alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases}$$

$$\alpha = \begin{cases} \theta + arctan\left(\dfrac{f1}{x1}\right) & x1 > 0 \\ \theta + 90° & x1 = 0 \\ \theta + arctan\left(\dfrac{f1}{x1}\right) + 180° & x1 < 0 \end{cases}.$$

Should read:

$$\begin{cases} k1 = 2 * \dfrac{\sqrt{x1^2 + f1^2}}{\sqrt{x1^2 + y1^2 + f1^2}} * \cos\alpha \\ k2 = f2 * \cot\alpha \\ k3 = f2 * \dfrac{B}{\sin\alpha} * \dfrac{\sqrt{s1^2 + y1^2 + f1^2}}{\sqrt{x1^{21} + f1^2}} \\ k4 = \dfrac{y1}{\sin\alpha * \sqrt{x1^2 + f1^2}} * f2 \\ \alpha = \begin{cases} \theta - \arctan\left(\dfrac{f1}{x1}\right) + 180° & x1 > 0 \\ \theta + 90° & x1 = 0 \\ \theta - \arctan\left(\dfrac{f1}{x1}\right) & x1 < 0 \end{cases} \end{cases} ;$$

At Column 35, Line 11, the formula reading $$\begin{cases} k1 = 2 * \dfrac{\sqrt{x1^2 + f1^2}}{\sqrt{x1^2 + y1^2 + f1^2}} * \cos\alpha \\ k2 = f2 * \cot\alpha \\ k3 = f2 * \dfrac{B}{\sin\alpha} * \dfrac{\sqrt{x1^2 + y1^2 + f1^2}}{\sqrt{x1^2 + f1^2}} \\ k4 = \dfrac{y1}{\sin\alpha * \sqrt{x1^2 + f1^2}} * f2 \\ \alpha = \begin{cases} \theta - arctan\left(\dfrac{f1}{x1}\right) + 180° & x1 > 0 \\ \theta + 90° & x1 = 0 \\ \theta - arctan\left(\dfrac{f1}{x1}\right) & x1 < 0 \end{cases} \end{cases} ;$$

Should read: